United States Patent
Kost et al.

(10) Patent No.: US 8,657,208 B2
(45) Date of Patent: Feb. 25, 2014

(54) SPLIT FLOW GATE FOR SPREADER

(75) Inventors: James A Kost, Willoughby, OH (US);
Andrew L Outcalt, Avon Lake, OH (US)

(73) Assignee: Meyer Products, LLC, Cleveland, OH (US)

( * ) Notice: Subject to any disclaimer, the term of this patent is extended or adjusted under 35 U.S.C. 154(b) by 450 days.

(21) Appl. No.: 13/093,230

(22) Filed: Apr. 25, 2011

(65) Prior Publication Data

US 2011/0259979 A1 Oct. 27, 2011

Related U.S. Application Data

(60) Provisional application No. 61/328,073, filed on Apr. 26, 2010.

(51) Int. Cl.
*B05B 17/04* (2006.01)
(52) U.S. Cl.
USPC ............... 239/7; 239/505; 239/512; 239/515; 239/661; 239/663; 239/676; 239/681; 222/545; 222/549
(58) Field of Classification Search
USPC ............. 239/7, 505, 506, 509, 510, 512–515, 239/650, 661, 663, 668, 676, 681, 686; 222/544, 545, 549, 559, 625
See application file for complete search history.

(56) References Cited

U.S. PATENT DOCUMENTS

| | | | |
|---|---|---|---|
| 4,991,781 A * | 2/1991 | Barbieri | 239/661 |
| 5,570,814 A | 11/1996 | Havlovitz | |
| 6,149,079 A | 11/2000 | Kinkead et al. | |
| 7,766,257 B2 * | 8/2010 | Gamble et al. | 239/676 |
| 8,474,735 B2 * | 7/2013 | Hobbs et al. | 239/681 |
| 2006/0042529 A1 | 3/2006 | Johnson et al. | |
| 2010/0326339 A1 | 12/2010 | Georgison et al. | |

OTHER PUBLICATIONS

PCT—Notification of Transmittal International Search Report and the Written Opinion of the International Searching Authority, Jan. 4, 2012, PCT/US2011/033870, Int'l Filing Date—Apr. 26, 2011.
PCT—International Search Report, Jan. 4, 2012, PCT/US2011/033870, Int'l Filing Date—Apr. 26, 2011.
PCT—International Written Opinion, Jan. 4, 2012, PCT/US2011/033870, Int'l Filing Date—Apr. 26, 2011.

* cited by examiner

*Primary Examiner* — Steven J Ganey
(74) *Attorney, Agent, or Firm* — Roger D. Emerson; Timothy D. Bennett; Emerson Thomson Bennett LLC

(57) ABSTRACT

A flow gate includes first and second body members, first and second flow control members, and first and second locking mechanisms. The first and second body members operatively attach to and detach from each other. The first and second flow control members adjust between an open position, a closed position, and a plurality of partially opened positions. The first and second locking mechanisms selectively prevent and allow adjustment of the first and second flow control members. The first and second flow control members prevent the flow of material from an associated spreader when both the first and second flow control members are in the closed position, and allow the flow of material from the associated spreader when either the first or the second flow control member is in the opened position or in one of the plurality of partially opened positions.

20 Claims, 17 Drawing Sheets

SPLIT FLOW GATE FOR SPREADER

CROSS-REFERENCE TO RELATED APPLICATIONS

This application claims the benefit of U.S. Provisional Application No. 61/328,073, titled SPLIT FLOW GATE FOR SPREADER, filed Apr. 26, 2010, which is herein incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK

Not Applicable.

BACKGROUND OF THE INVENTION

1. Field of the Invention

This invention relates generally to the art of spreaders for the spreading of granular material, salt spreaders or lawn care spreaders, as for fertilizer, and more specifically, to a flow gate mechanism which can be used in conjunction with such a spreader.

2. Description of Related Art

It is known in the art to provide a spreader, such as one mounted on the back of a pickup truck, to distribute and spread granular material such as rock salt or sand to aid in the maintenance and clearing of ice and snow. It is also known to provide a flow gate for such a spreader in order to better control the distribution of such granular material.

Previously, it was known that flow gates could be retrofitted and adapted to an existing spreader, or provided as original equipment to a spreader. To install the previous flow gate, one needed to partially disassemble the spreader so that the flow gate mechanism could be interposed between the spreader container and the distribution mechanism below the spreader.

For example, FIGS. 1-8 show a prior art flow gate 200. This prior art flow gate 200 will be referred to in order to illustrate the advantages and improvement of the inventive flow gate. In the prior art flow gate, adjustments of the position of the first and second barrier members 212, 214 was secured by a spring loaded securing mechanism 216. The securing mechanism fits into a series of spaced holes 202 in the first and second barrier members 212, 214. Further, as can be illustrated with reference to FIGS. 3 and 8, the first and second barrier members 212, 214 have no mechanism to retain them within the slots formed by the body member 204. As such, as best illustrated FIG. 8, the first barrier member 212 can be removed completely from the body member 214. Should the securing mechanism 216 be improperly fitted so that it passes through one of the holes 202 in the first barrier member, use of the spreader, or even transporting the spreader over bumpy or uneven roads, might cause the first and second barrier members 212, 214 to vibrate out of the body member 204 and be lost. In addition, the prior art flow gate 200 was attached to the associated spreader by flange or ears 206, as shown in FIG. 5 and others. This prior art design, as shown in FIGS. 1-8, required that the auger and the throat first be separated before the flow gate 200 could be bolted to the associated spreader through ears 206 with the associated fasteners.

Therefore, what is needed is a flow gate that overcomes one or more deficiencies in the prior art.

BRIEF SUMMARY OF THE INVENTION

According to one embodiment of this invention, a flow gate for an associated spreader includes: a first body member including a first attachment portion and a first sleeve portion; a second body member including a second attachment portion and a second sleeve portion, wherein the first and second body members selectively attach to and detach from each other; a first flow control member received within the first sleeve portion and adjustable between an open position, a closed position, and a plurality of partially opened positions; a second flow control member received within the second sleeve portion and adjustable between an open position, a closed position, and a plurality of partially opened positions; a first locking mechanism having locked and unlocked conditions, wherein the locked condition prevents the first flow control member from adjusting and the unlocked condition allows the first flow control member to adjust; and a second locking mechanism having locked and unlocked conditions, wherein the locked condition prevents the first flow control member from adjusting and the unlocked condition allows the first flow control member to adjust. The first and second flow control members can prevent the flow of material from the associated spreader when both the first and second flow control members are in the closed position, and can allow the flow of material from the associated spreader when either the first or the second flow control member is in the opened position or in one of the plurality of partially opened positions.

The first and second attachment portions can be shaped to fixedly attach to an associated hopper of the associated spreader. The first and second attachment portions can include flanges that receive fasteners for attaching the body members to each other. A resilient material can be located between the flanges of the first and second body members. The first and second attachment portion can include projections extending inwardly, wherein the projections at least partially extend into an exterior surface of the associated hopper.

The first locking mechanism can be fixedly attached to the first flow control member and the second locking mechanism can be fixedly attached to the second flow control member, wherein the first locking mechanism can extend through a first slot in the first body member and the second locking mechanism can extend through a second slot in the second body member. A distal end of the first slot can maintain the first locking mechanism within the first slot which maintains the first flow control member within the first sleeve portion, and a distal end of the second slot can maintain the second locking mechanism second the first slot which maintains the second flow control member within the second sleeve portion.

The first locking mechanism can include a first fastener fixedly attached to the first flow control member, wherein the first fastener is received within a first slot in the first body member, and wherein a distal end of the first slot maintains the first fastener within the first slot which maintains the first flow control member within the first sleeve portion. The second locking mechanism can include a second fastener fixedly attached to the second flow control member, wherein the second fastener is received within a second slot in the second body member, and wherein a distal end of the second slot maintains the second fastener within the second slot which maintains the second flow control member within the second sleeve portion.

According to another embodiment, a spreader assembly includes: a hopper capable of holding material suitable for spreading onto an associated ground surface; and a flow gate operatively connected to the hopper and capable of controlling the flow of the material from the hopper. The spreader assembly can further include a spinner mechanism having a spinner plate suitable to receive the material from the hopper and to spread the material onto the associated ground surface.

According to another embodiment, a method of attaching a flow gate to an associated spreader can include the following steps: separating first and second body members of a flow gate for an associated spreader; positioning the first and second body members on either side of an outlet of the associated spreader; and attaching the first and second body members to each other which secures the flow gate to the spreader. The step of separating first and second body members can further include loosening first and second fasteners. The step of attaching the first and second body members can further include tightening the first and second fasteners.

The flow gate provided herein provides various new structure and features which improves upon the previous flow gate. The structural features of the flow gate provide significant advantages over the prior art. One of the features of the invention is a split design which enables the flow gate to be fitted to a spreader without disassembling the spreader.

Another feature includes projections which may be used to control movement of the flow gate axially along the axis of the auger, as well as perpendicular to it, in response to the vibration caused by operation and transport.

Another feature includes a mechanism whereby the flow control members may be adjustably translated in such a way as to control the volume of granular material flown through the flow gate in such desired position may be advantageously secured via a wing nut or similar fastening member. In addition, another feature includes a stop mechanism which prevents the flow control member slide from sliding completely out of its sleeve and being lost.

Another feature of the innovative flow gate includes resiliently deformable spacers between the two halves of the flow gate throat so that manufacturing tolerances, vibration, etc. can be accumulated and accommodated by the resilient spacers.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 9:
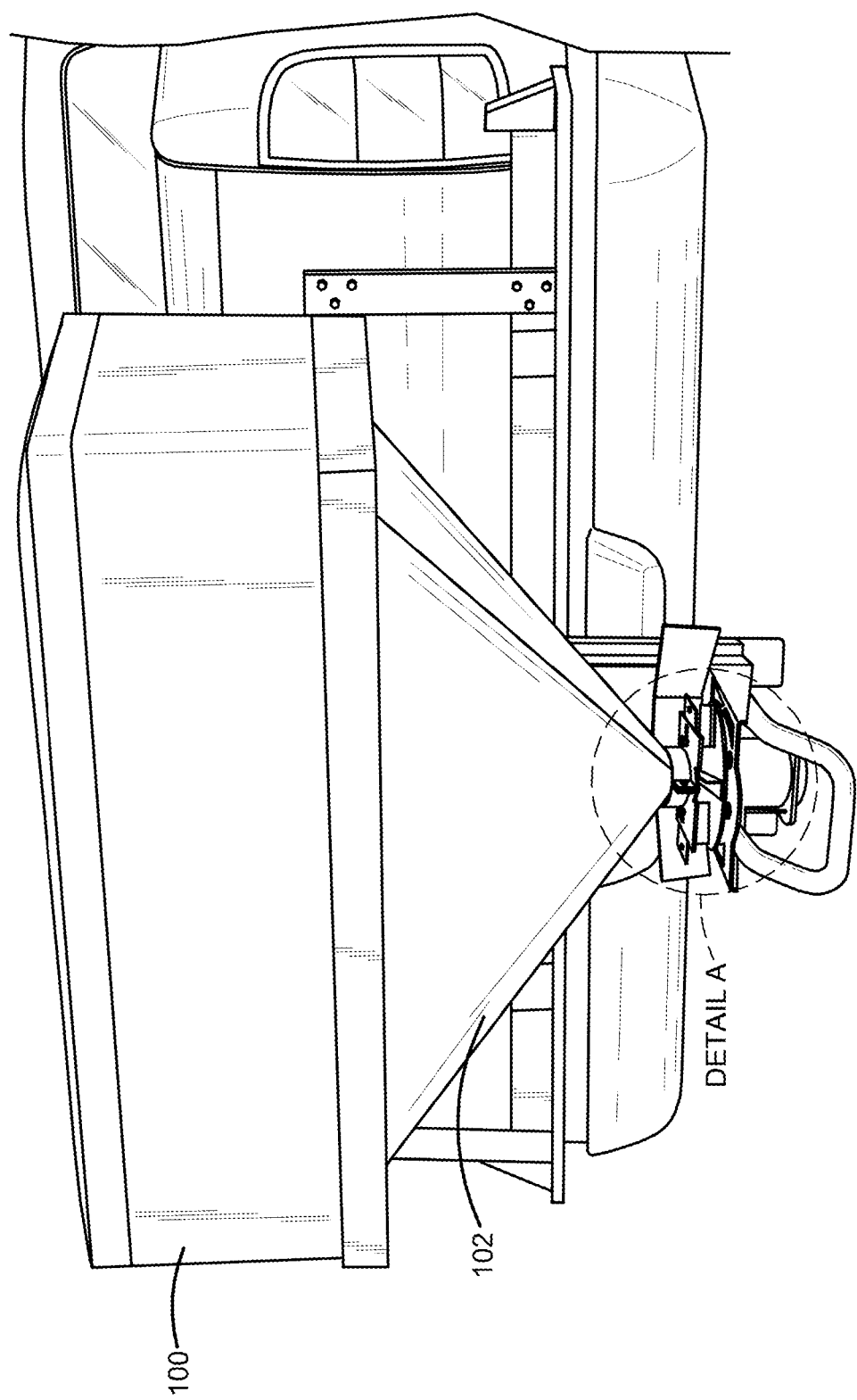
FIG. 9 shows a perspective view of a spreader, according to one embodiment of the invention.
Figure 9A:
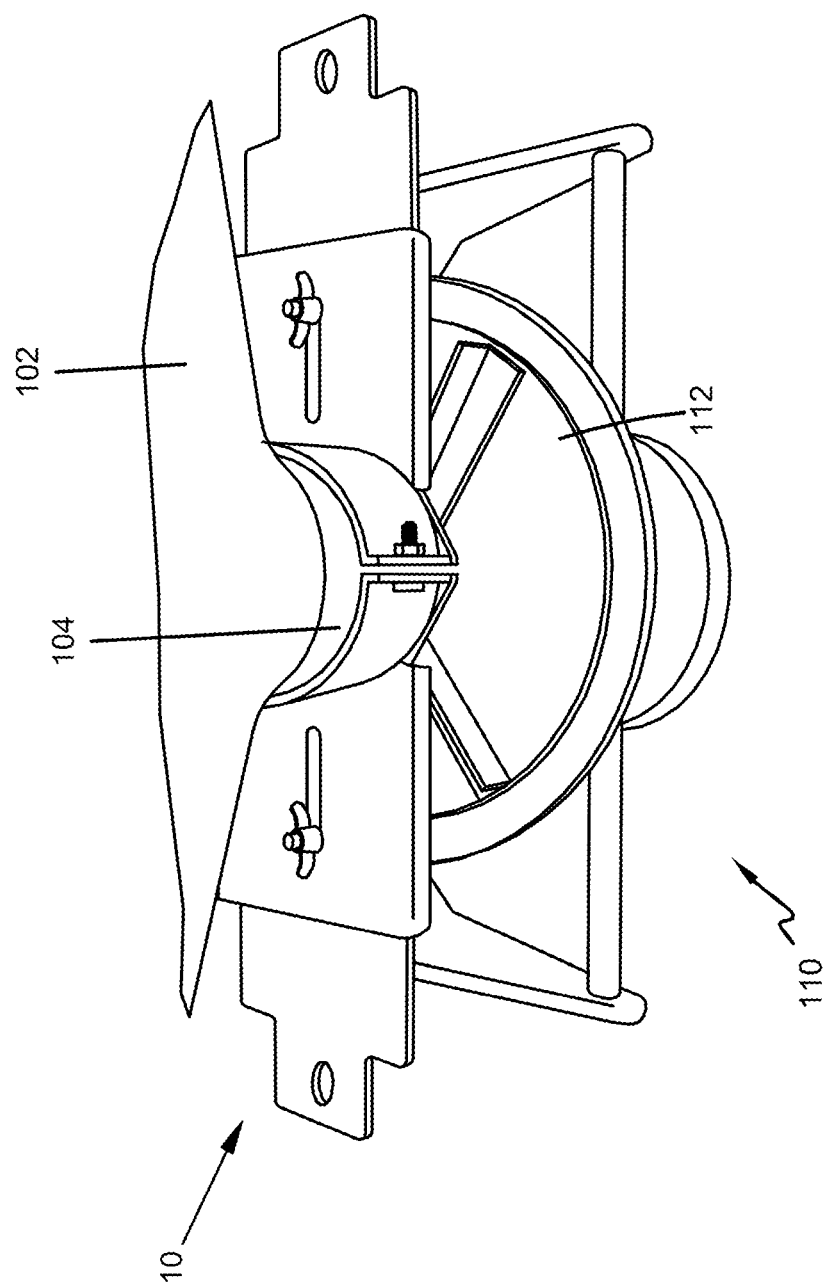
FIG. 9A shows detail A of the spreader in FIG. 9, according to one embodiment.
Figure 10:
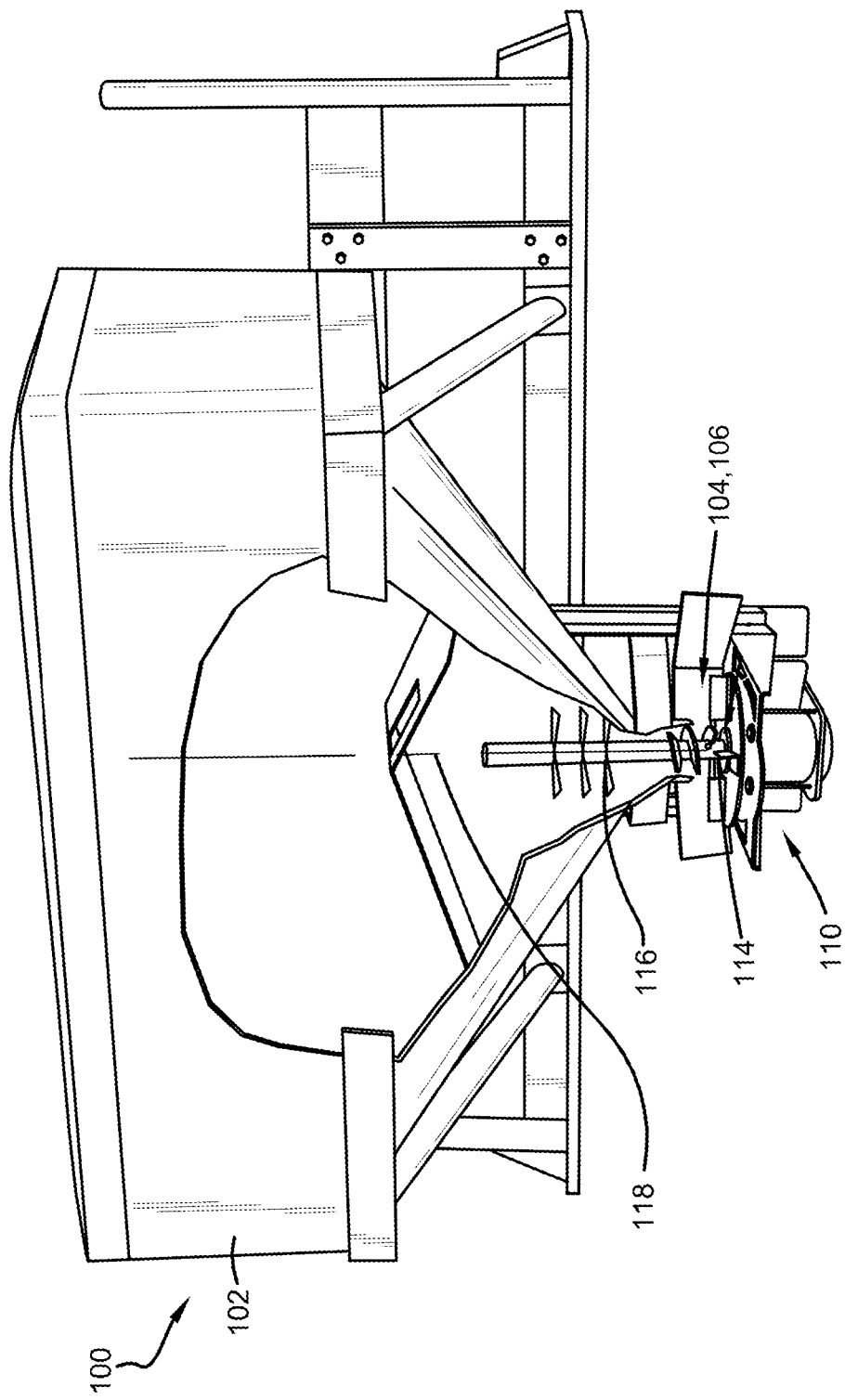
FIG. 10 shows a partial cutaway view of a spreader, according to one embodiment.
Figure 11:
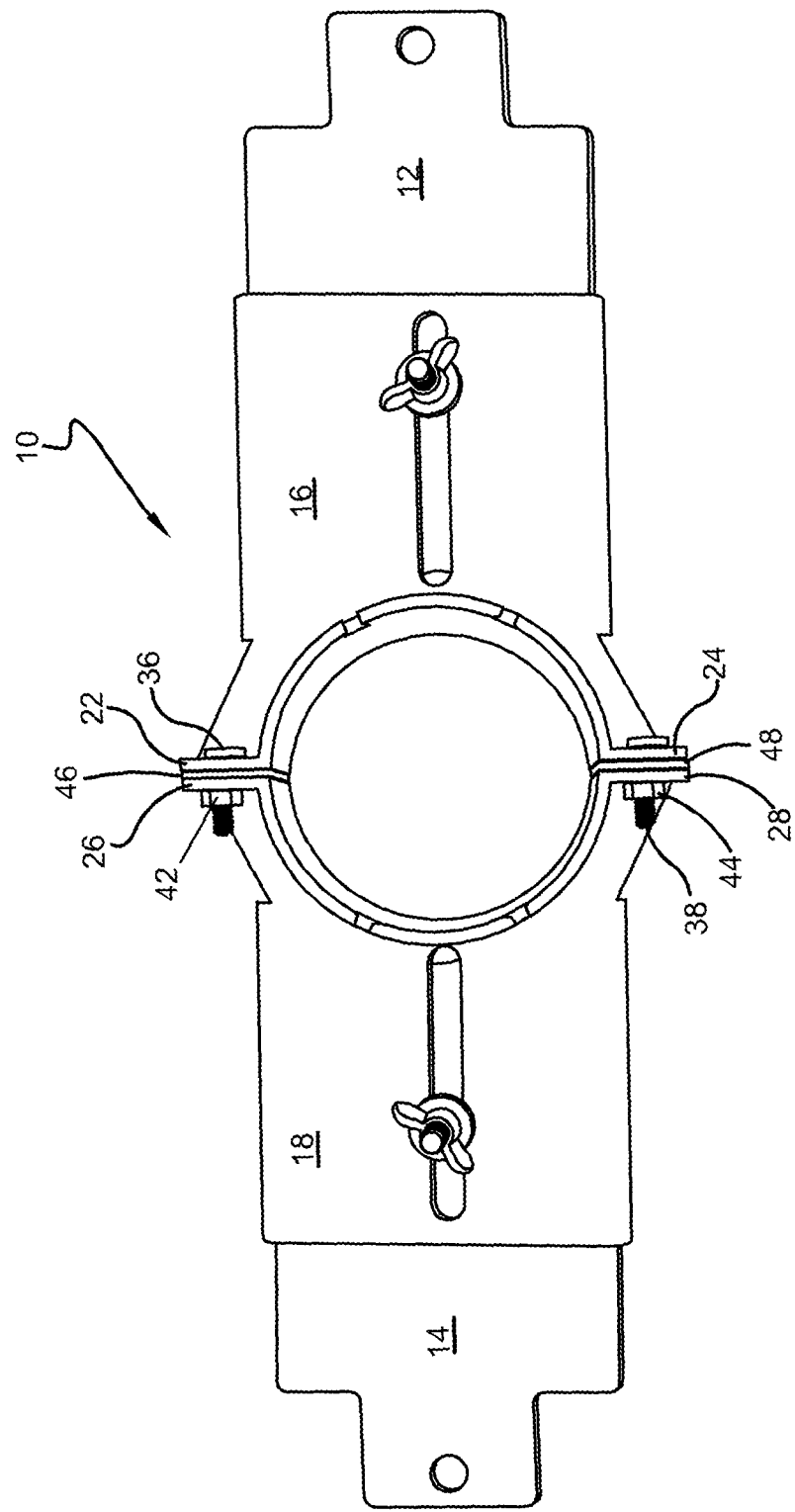
FIG. 11 shows a top view of a flow gate, according to one embodiment.

Referring now to the drawings wherein the showings are for purposes of illustrating embodiments of the invention only and not for purposes of limiting the same, and wherein like reference numerals are understood to refer to like components, FIGS. 9, 9A, and 10 show a spreader 100, which can include a flow gate 10, according to one or more embodiments of this invention. The spreader 100 can include a hopper 102 and a spinner mechanism 110. The hopper 102 can contain various types of material which can exit the hopper 102 through an opening 106 in the outlet or throat 104. The spinner mechanism 110 can include a spinner plate 112 that rotates to spread material on the ground surface. The spinner mechanism 110 can include a shaft 114 extending at least partially into the hopper 102. The spreader 100 can include an auger 116 to assist in moving the material from within the spreader 100 to the opening 106 in outlet or throat 104 so the material can exit the spreader 100. The auger 116 can have a vertical or a horizontal orientation. The auger 116 can be mounted or integrally formed on the shaft 114 in a vertical orientation. The shaft 114 can define an axis 118 extending through the opening 106 in the throat 104 of the hopper 102.

With reference to FIGS. 11-16, the flow gate 10 can include first and second body members 16, 18 and first and second flow control members 12, 14. The first body member 16 can include an attachment portion 92 and a sleeve portion 96, and the second body member 18 can include an attachment portion 94 and a sleeve portion 98. The attachment portions 92, 94 can be curved, and in one embodiment, are substantially semi-circular. The attachment portions 92, 94 can include one or more projections 90 extending inwardly. The projections 90 can contact the wall of the hopper 102 to assist in maintaining the position of the flow gate 10 in relation to the hopper 102 when the flow gate 10 is installed on a spreader 100. The projections 90 can at least partially extend the wall of the hopper 102. The projections 90 can prevent the flow gate 10 from moving in a vertical direction along axis 118 and from rotating about axis 118. The attachment portions 92, 94 can include one or more set screws, instead of the projections 90, to secure the flow gate 10 to the spreader 100.

The body members 16, 18 can include apertures 76, 78 in the sleeve portions 96, 98. The apertures 76, 78 can be slots extending in the longitudinal direction of the sleeve portions 96, 98. The slots 76, 78 can include distal ends 82, 84. The body members 16, 18 can include extensions 52, 54, 56, 58 which can form at least a portion the bottom of the sleeve portions 96, 98. Extensions 52, 54, 56, 58 can be the edges of the body members 16, 18 which can be bent or curved through an arc of approximately 180 degrees to form the sides and bottoms of the sleeves or slots 96, 98. The sleeves 96, 98 can receive the first and second flow control members 12, 14 in a sliding relation. The first and second body members 16, 18 can be selectively joined together via flanges 22, 24, 26, 28 with a fastening mechanism including, but not limited to, fasteners such as bolts 36, 38 and nuts 42, 44. Spacers 46, 48 can be selectively inserted between the flanges 22, 24, 26, 28. The spacers 46, 48 can be formed of a variety of different materials including, but not limited to, resilient materials such as rubber or sponge.

The flow control members 12, 14 can include locking mechanisms 72, 74 which can extend from the flow control members 12, 14 through apertures 76, 78 in the body members 16, 18. The locking mechanisms 72, 74 can be fixedly attached to the flow control members 12, 14. The first locking mechanism 72 can be fixed in relation to the first control member 12 and the second locking mechanism 74 can be fixed in relation to the second control member 14. In one embodiment, the locking mechanisms 72, 74 include bolts or studs fixedly attached to the flow control members 12, 14 and nuts or wing nuts tightened and loosened on the bolts or studs to respectively lock and unlock the locking mechanisms 72, 74. In some embodiments, the flow control members 12, 14 can include the apertures or slots 76, 78 and the body members 16, 18 can include the locking mechanisms 72, 74. In other embodiments, both the body members 16, 18 and the flow control members 12, 14 can include slots 76, 78 with the locking mechanisms 72, 74 extending through slots in both the body members 16, 18 and the flow control members 12, 14. The flow control members 12, 14 can include a recess or indentation 122 on the proximal ends. The recesses 122 can be sized to fit around the shaft 114 when the flow gate 10 is installed on an associated spreader 100. The flow control members 12, 14 can include apertures 124 on the distal ends.

A method of attaching the flow gate 10 to an associated spreader 100 will now be described, according to some embodiments. The flow gate 10 can be easily attached to and detached from the associated spreader 100 without disassembling the spreader. Each of the two separate body members 16, 18 can be placed on either side of the outlet or throat 104 of the hopper 102. The body members 16, 18 can then be selectively attached to each other by the fastening mechanisms 36, 38. Once the body members 16, 18 are attached to each other, the flow gate is securely fastened to the spreader 100, with the projections 90 at least partially extending into the exterior wall of the hopper 102. The flow gate 10 can also be easily removed from the spreader 100 by selectively detaching the body members 16, 18 from each other.

Figure 1:
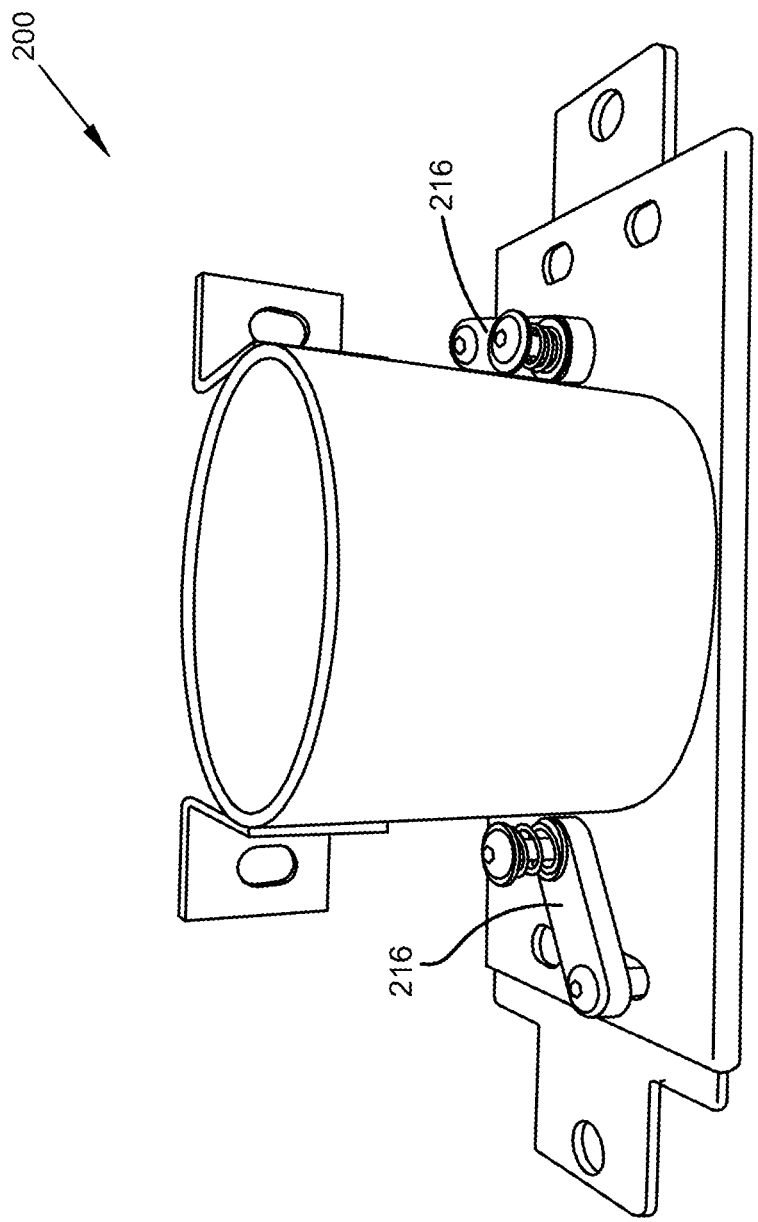
FIG. 1 shows a perspective view of the flow gate of the prior art.
Figure 2:
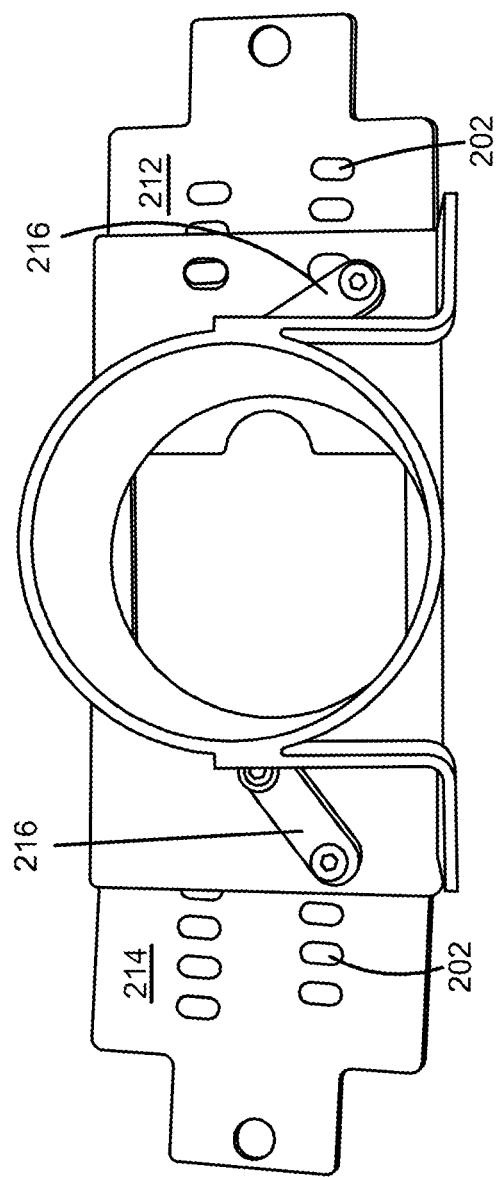
FIG. 2 shows a top view of the flow gate of the prior art.
Figure 3:
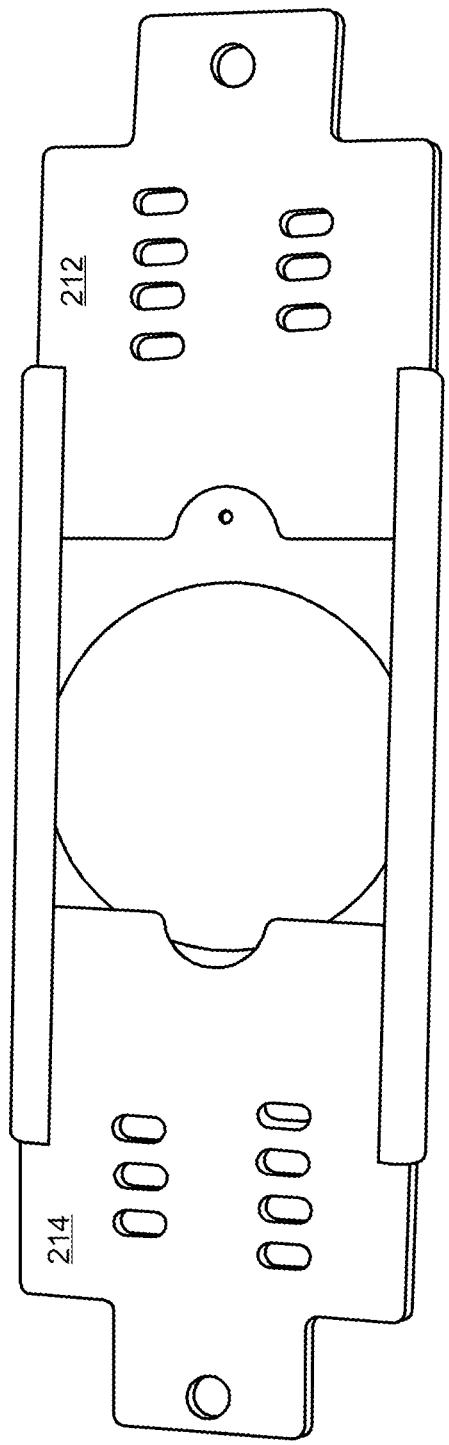
FIG. 3 shows a bottom view of the flow gate of the prior art.
Figure 4:
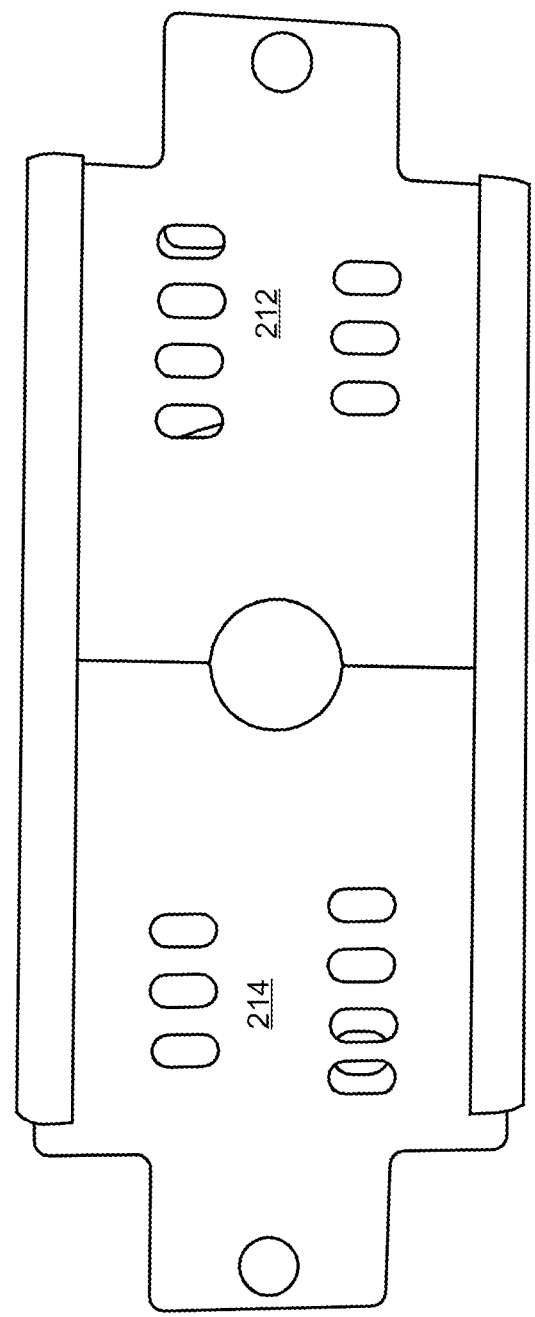
FIG. 4 shows a bottom view of the flow gate of the prior art.
Figure 5:
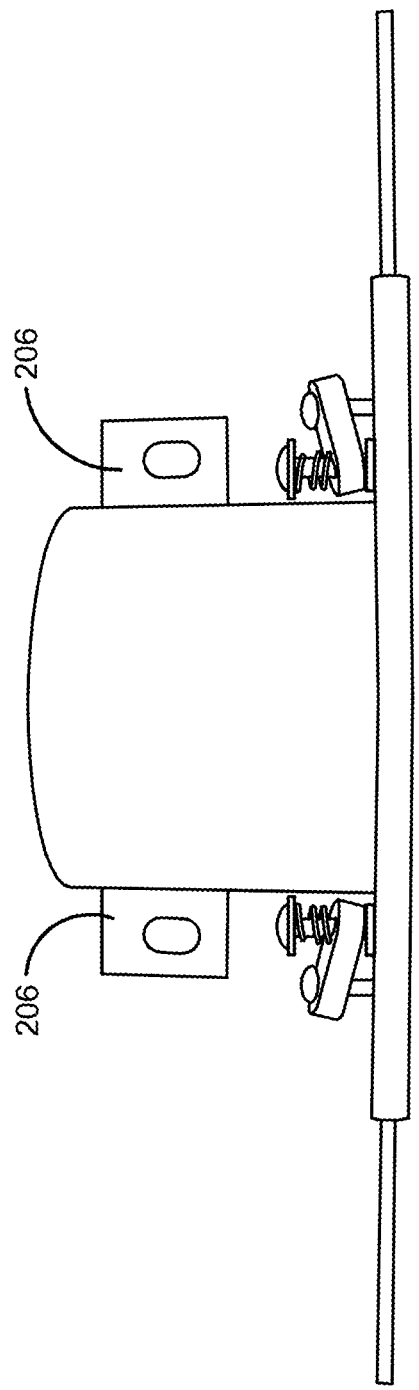
FIG. 5 shows a front view of the flow gate of the prior art.
Figure 6:
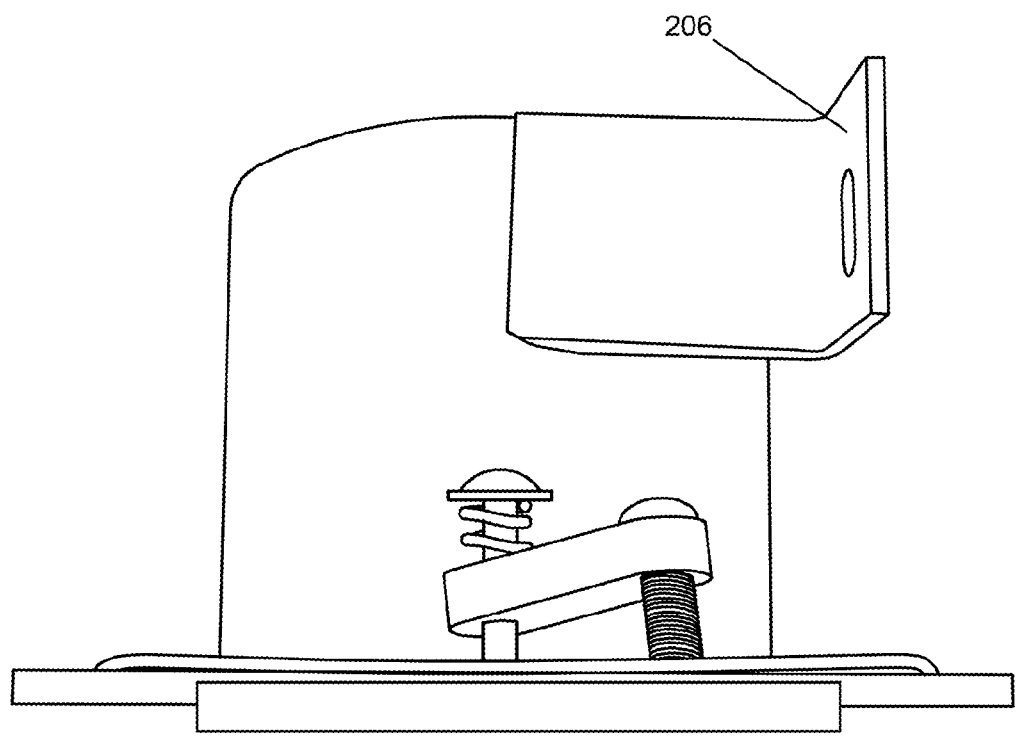
FIG. 6 shows a side view of the flow gate of the prior art.
Figure 7:
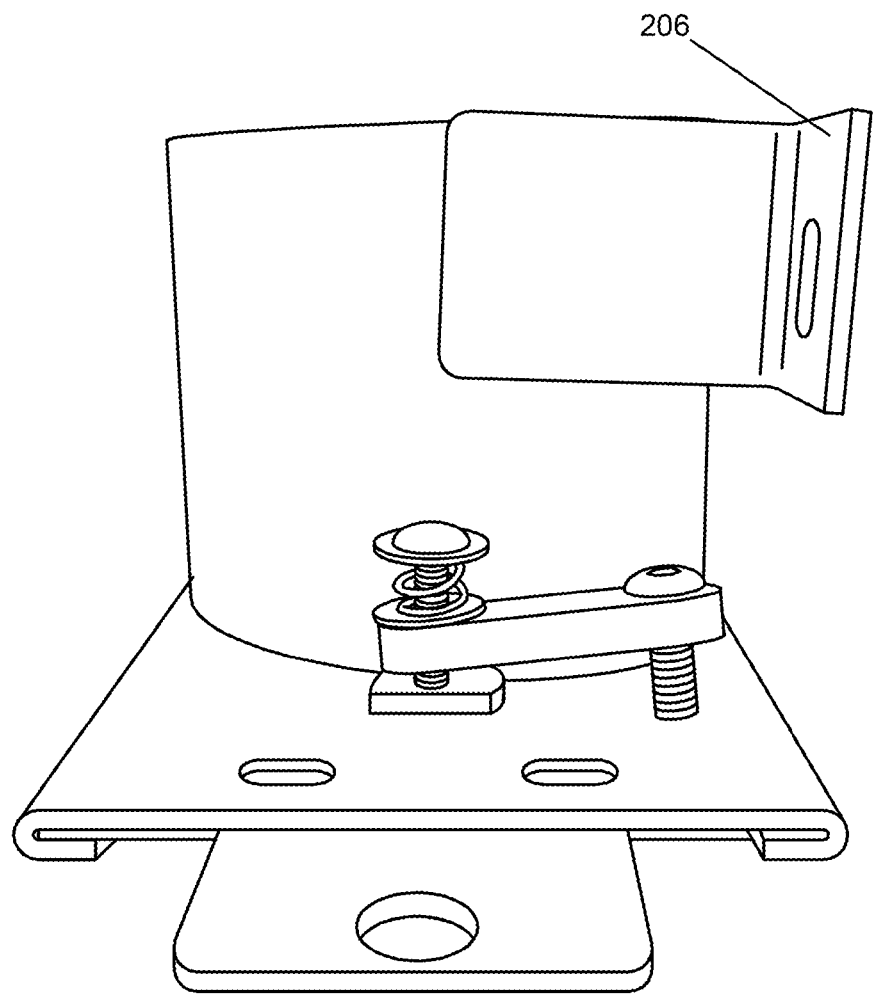
FIG. 7 shows a side view of the flow gate of the prior art.
Figure 8:
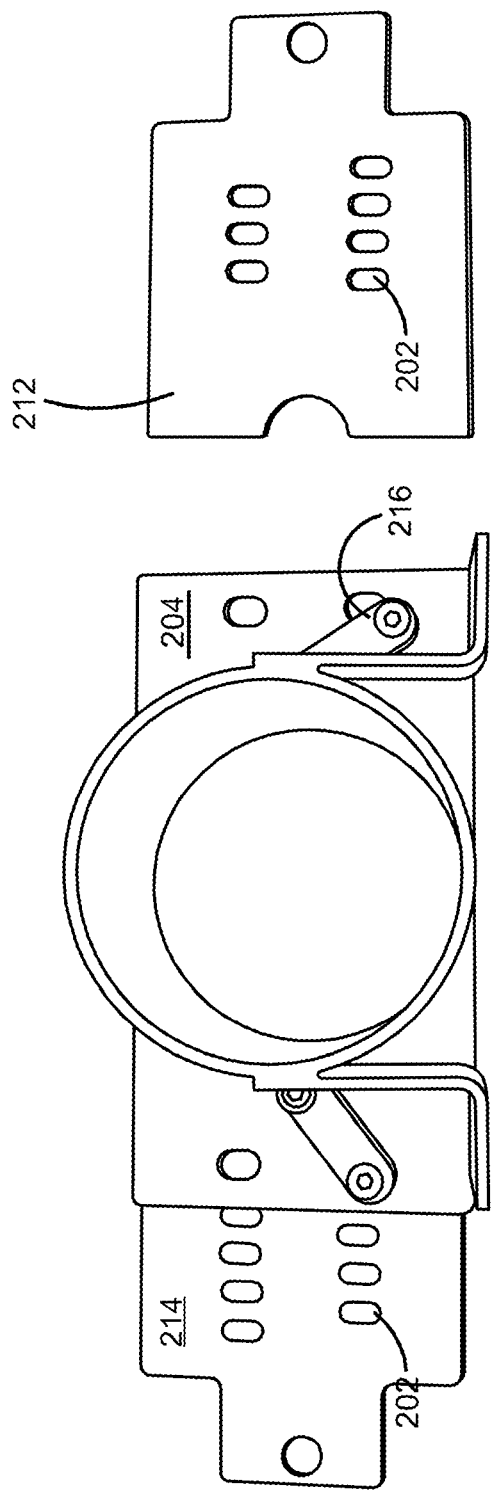
FIG. 8 shows a top view of the flow gate of the prior art.

The flow gate 10 can be assembled and attached to a spreader 100 by loosening the fasteners 36, 38 and 42, 44 and separating the first body member 16 from the second body member 18. Then, the first body member 16 and the second body member 18 can be reassembled around the outlet or throat 104 of the associated spreader 100 so that the first and second attachment portions 92, 94 fit around the throat 104 and the projections 90 extend into an exterior surface of the throat 104. After the fasteners 36, 38 and 42, 44 are reassembled and tightened, the flow gate 10 is attached to the spreader without disassembling the spreader 100 or using a more expensive alternative such as the ears 206 of the prior art, shown in prior art FIG. 5, with associated fasteners.

Figure 12:
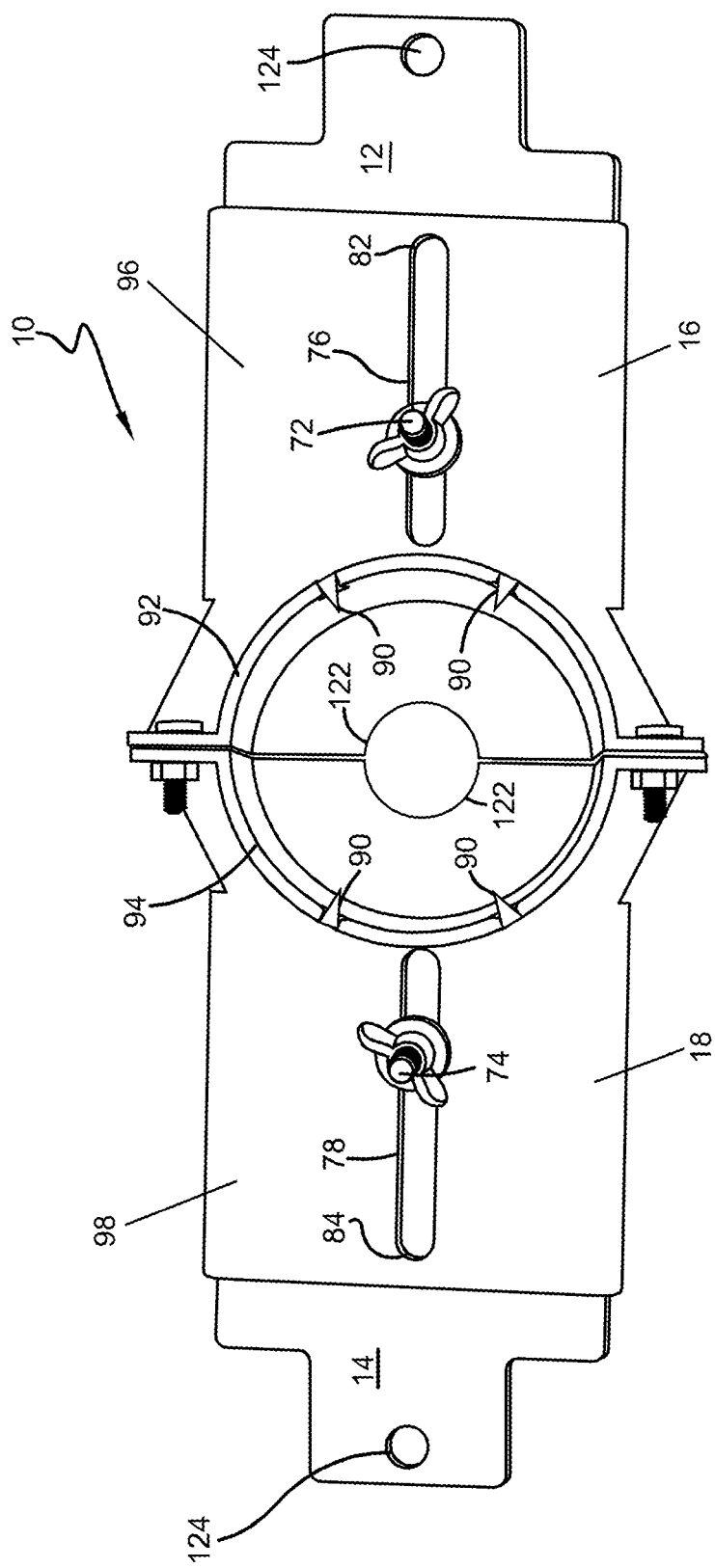
FIG. 12 shows a top view of a flow gate, according to one embodiment.
Figure 13:
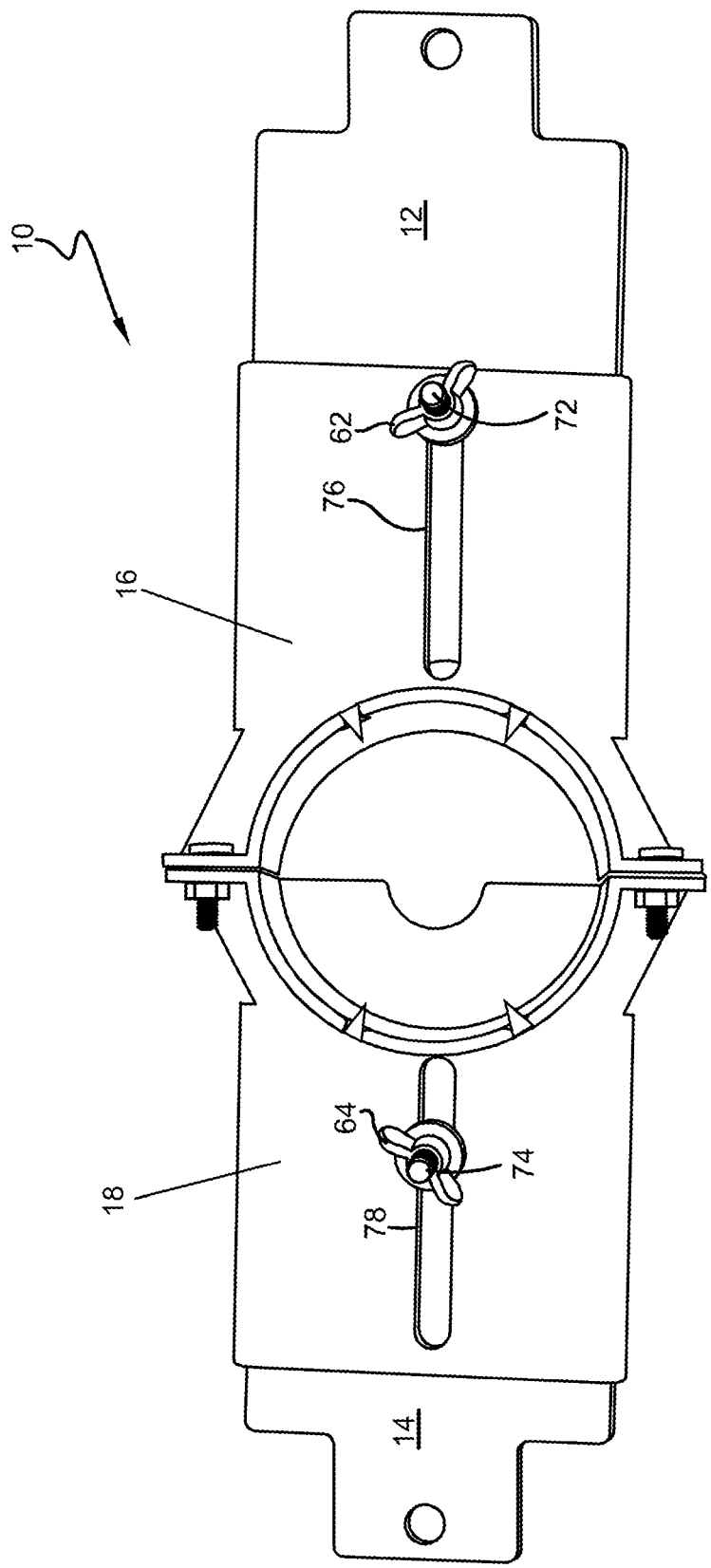
FIG. 13 shows a top view of a flow gate, according to one embodiment.
Figure 14:
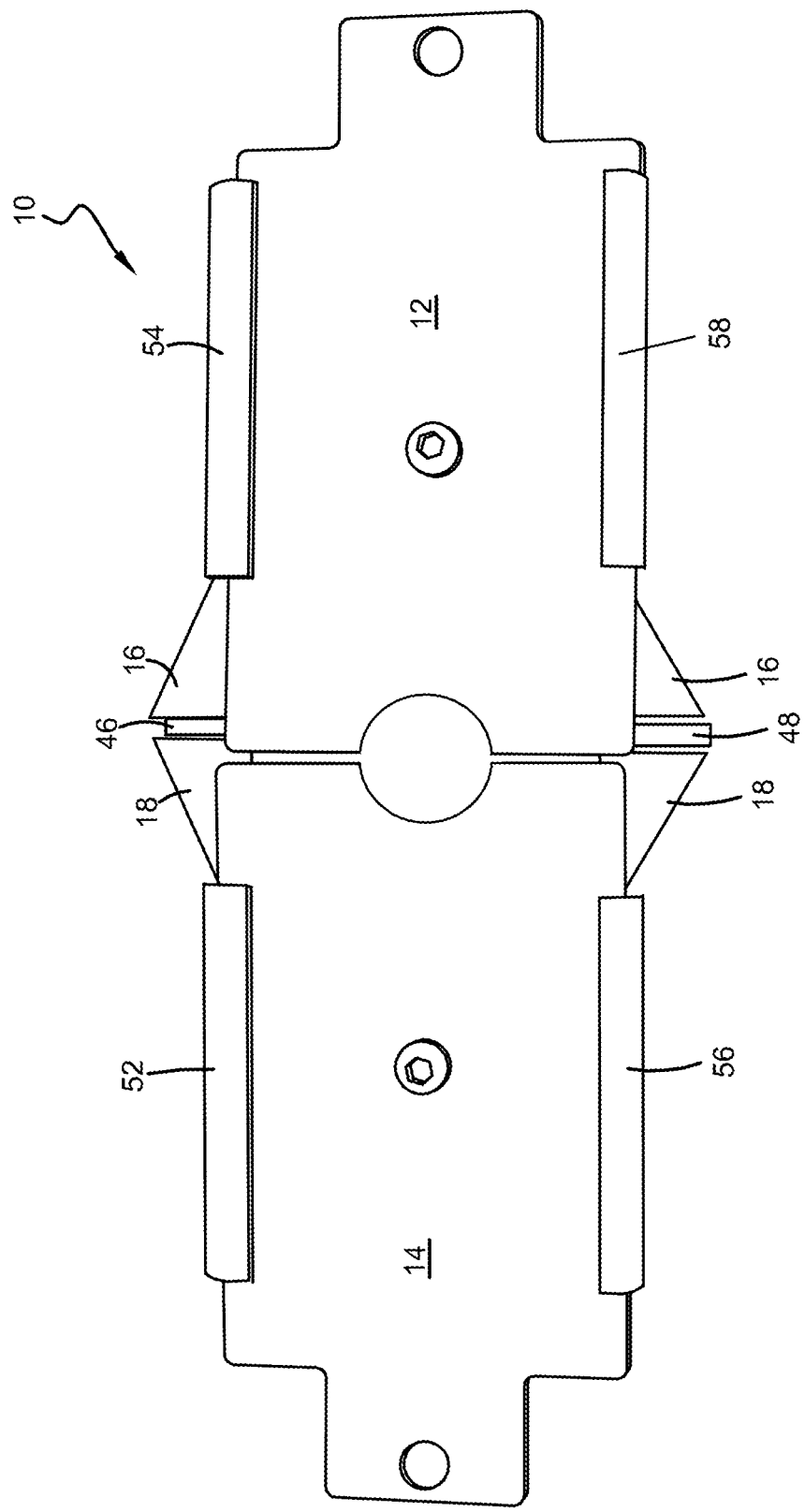
FIG. 14 shows a bottom view of a flow gate, according to one embodiment.
Figure 15:
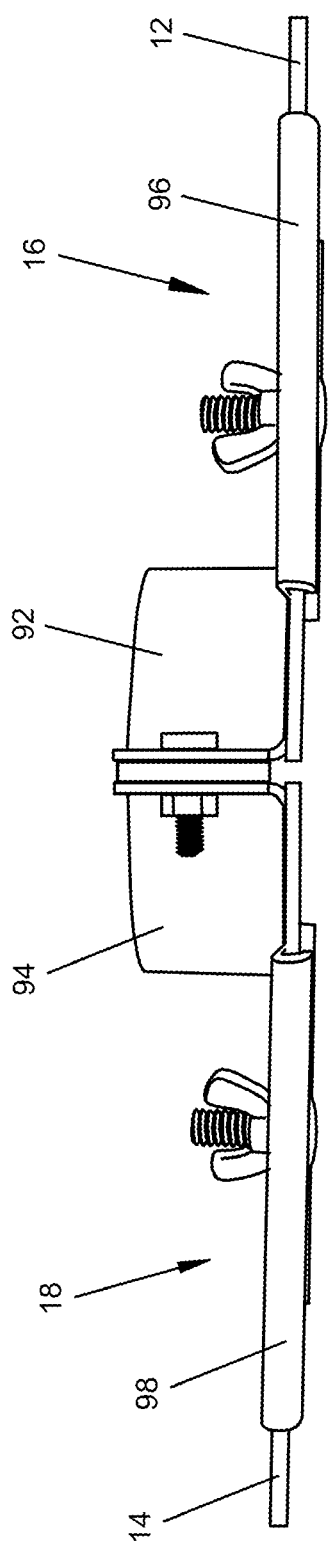
FIG. 15 shows a front view of a flow gate, according to one embodiment.
Figure 16:
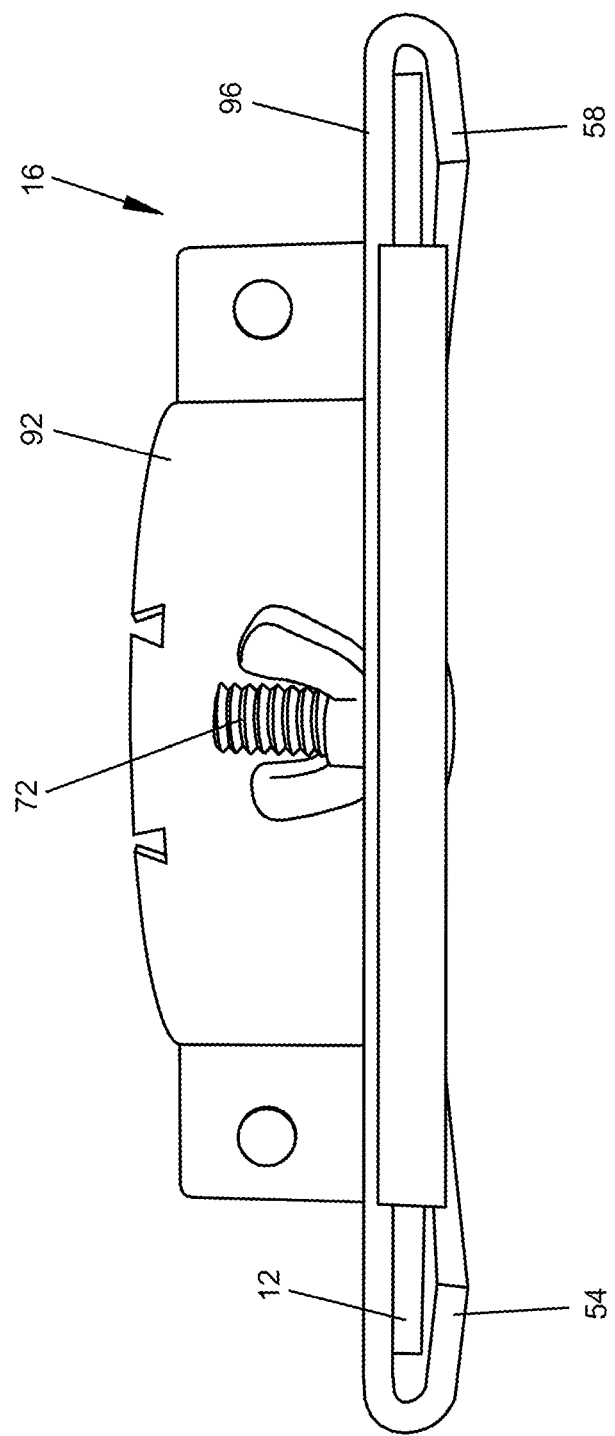
FIG. 16 shows a side view of a flow gate, according to one embodiment.

A method of operating the flow gate 10 will be described, according to some embodiments. After the flow gate 10 has been attached to the spreader 100, the flow gate 10 can control the amount of material exiting the spreader 100 for spreading on the ground surface. Each flow control member 12, 14 can adjust between an open or fully open position, a closed or completely closed position, and a plurality of partially opened or partially closed positions. The flow gate 10 can provide infinite adjustment of the flow of material from the spreader 100. By moving the locking mechanisms 72, 74 to infinitely variable positions within the slots 76, 78, the flow control members 12, 14 move to infinitely variable positions within the sleeves or slots 96, 98. Each flow control member 12, 14 can be adjusted independently of the other. Typically, each of the flow control member 12, 14 would be positioned in approximately equivalent or nearly equivalent positions. In FIG. 12, both flow control members 12, 14 are shown in the closed position. In FIG. 13, the second flow control member 14 is shown in the closed or completely closed position and the first control member 12 is shown in the open or fully open position. To adjust the flow gate 10, either flow control member or both flow control members 12, 14 can be adjusted. To adjust the first flow control member 12, the first locking mechanism 72 is unlocked and the first flow control member 12 is moved within sleeve 96. Once the first flow control member 12 is in the desired position, the first locking mechanism 72 is locked maintaining the position of the first flow control member 12. The second flow control member 14 can be adjusted or repositioned in substantially the same manner by unlocking and locking the second locking mechanism 74.

The distal ends 82, 84 of the slots 76, 78 can operate as stops to keep the locking mechanisms 72, 74 from sliding completely out of the slots 76, 78. Because the locking mechanisms 72, 74 are operatively or fixedly attached to the first and second flow control members 12, 14, the distal ends 82, 84 can prevent the locking mechanisms 72, 74 from sliding completely out of the slots 76, 78, which prevents the first and second flow control members 12, 14 from sliding completely out of the sleeves or slots 96, 98.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A flow gate for an associated spreader comprising:
   a first body member including a first attachment portion and a first sleeve portion;
   a second body member including a second attachment portion and a second sleeve portion, wherein the first and second body members operatively attach to each other;
   a first flow control member received within the first sleeve portion and adjustable between an open position, a closed position, and a plurality of partially opened positions;
   a second flow control member received within the second sleeve portion and adjustable between an open position, a closed position, and a plurality of partially opened positions;
   a first locking mechanism having locked and unlocked conditions, wherein the locked condition prevents the first flow control member from adjusting and the unlocked condition allows the first flow control member to adjust; and
   a second locking mechanism having locked and unlocked conditions, wherein the locked condition prevents the second flow control member from adjusting and the unlocked condition allows the second flow control member to adjust;

wherein the first and second flow control members prevent the flow of material from the associated spreader when both the first and second flow control members are in the closed position, and wherein the first and second flow control members allow the flow of material from the associated spreader when one of the first and the second flow control members is in the position selected from the group comprising the opened position and the plurality of partially opened positions.

2. The flow gate of claim 1, wherein the first and second attachment portions are shaped to fixedly attach to an associated hopper of the associated spreader.

3. The flow gate of claim 1, wherein the first and second attachment portions include flanges that receive fasteners for attaching the body members to each other, and wherein a resilient material is located between the first and second body members.

4. The flow gate of claim 1, wherein the first and second attachment portions include projections extending inwardly, and wherein the projections at least partially extend into an exterior surface of an associated hopper of the associated spreader.

5. The flow gate of claim 1, wherein the first locking mechanism is fixedly attached to the first flow control member and the second locking mechanism is fixedly attached to the second flow control member, and wherein the first locking mechanism substantially extends through a first slot in the first body member and the second locking mechanism substantially extends through a second slot in the second body member.

6. The flow gate of claim 5, wherein a distal end of the first slot maintains the first locking mechanism within the first slot which maintains the first flow control member within the first sleeve portion, and a distal end of the second slot maintains the second locking mechanism within the second slot which maintains the second flow control member within the second sleeve portion.

7. The flow gate of claim 1, wherein the first locking mechanism comprises a first fastener fixedly attached to the first flow control member, wherein the first fastener is received within a first slot in the first body member, and wherein a distal end of the first slot maintains the first fastener within the first slot which maintains the first flow control member within the first sleeve portion.

8. The flow gate of claim 7, wherein the second locking mechanism comprises a second fastener fixedly attached to the second flow control member, wherein the second fastener is received within a second slot in the second body member, and wherein a distal end of the second slot maintains the second fastener within the second slot which maintains the second flow control member within the second sleeve portion.

9. A spreader assembly comprising:
a hopper capable of holding material suitable for spreading onto an associated ground surface; and
a flow gate operatively connected to the hopper and capable of controlling the flow of the material from the hopper, the flow gate comprising:
a first body member including a first attachment portion and a first sleeve portion;
a second body member including a second attachment portion and a second sleeve portion, wherein the first and second body members operatively attach to each other;
a first flow control member received within the first sleeve portion and adjustable between an open position, a closed position, and a plurality of partially opened positions;
a second flow control member received within the second sleeve portion and adjustable between an open position, a closed position, and a plurality of partially opened positions;
a first locking mechanism having locked and unlocked conditions, wherein the locked condition prevents the first flow control member from adjusting and the unlocked condition allows the first flow control member to adjust; and
a second locking mechanism having locked and unlocked conditions, wherein the locked condition prevents the second flow control member from adjusting and the unlocked condition allows the second flow control member to adjust;
wherein the first and second flow control members prevent the flow of material from the hopper when both the first and second flow control members are in the closed position, and wherein the first and second flow control members allow the flow of material from the hopper when one of the first and the second flow control members is in the position selected from the group comprising the opened position and the plurality of partially opened positions.

10. The spreader assembly of claim 9, wherein the first and second attachment portions are shaped to fixedly attach to the hopper.

11. The spreader assembly of claim 9, wherein the first and second attachment portions include flanges that receive fasteners for attaching the body members to each other, and wherein a resilient material is located between the first and second body members.

12. The spreader assembly of claim 9, wherein the first and second attachment portions include projections extending inwardly, and wherein the projections at least partially extend into an exterior surface of the hopper.

13. The spreader assembly of claim 9, wherein the first locking mechanism is fixedly attached to the first flow control member and the second locking mechanism is fixedly attached to the second flow control member, and wherein the first locking mechanism substantially extends through a first slot in the first body member and the second locking mechanism substantially extends through a second slot in the second body member.

14. The spreader assembly of claim 13, wherein a distal end of the first slot maintains the first locking mechanism within the first slot which maintains the first flow control member within the first sleeve portion, and a distal end of the second slot maintains the second locking mechanism within the second slot which maintains the second flow control member within the second sleeve portion.

15. The spreader assembly of claim 9, wherein the first locking mechanism comprises a first fastener fixedly attached to the first flow control member, wherein the first fastener is received within a first slot in the first body member, and wherein a distal end of the first slot maintains the first fastener within the first slot which maintains the first flow control member within the first sleeve portion.

16. The spreader assembly of claim 15, wherein the second locking mechanism comprises a second fastener fixedly attached to the second flow control member, wherein the second fastener is received within a second slot in the second body member, and wherein a distal end of the second slot maintains the second fastener within the second slot which maintains the second flow control member within the second sleeve portion.

17. The spreader assembly of claim 9, further comprising:
a spinner mechanism including a spinner plate suitable to receive the material from the hopper and to spread the material onto the associated ground surface.

18. A method comprising the steps of:
(A) providing a spreader assembly comprising a hopper capable of holding material suitable for spreading onto an associated ground surface;
(B) providing a flow gate operatively connected to the hopper and capable of controlling the flow of the material from the hopper, the flow gate comprising: (1) a first body member including a first attachment portion and a first sleeve portion; (2) a second body member including a second attachment portion and a second sleeve portion, wherein the first and second body members operatively attach to each other; (3) a first flow control member received within the first sleeve portion; (4) a second flow control member received within the second sleeve portion; (5) a first locking mechanism having locked and unlocked conditions, wherein the locked condition prevents the first flow control member from adjusting and the unlocked condition allows the first flow control member to adjust; and, (6) a second locking mechanism having locked and unlocked conditions, wherein the locked condition prevents the second flow control member from adjusting and the unlocked condition allows the second flow control member to adjust;
(C) adjusting the first and second control members into a closed position where the first and second control members prevent flow of material from the hopper; and,
(D) adjusting at least one of the first and second control members into one of an opened position and one of a plurality of partially opened positions to allow flow of material from the hopper.

19. The method of claim 18 wherein:
step (C) comprises the steps of: (1) sliding the first flow control member within the first sleeve portion; and, (2) sliding the second flow control member within the second sleeve portion; and,
step (D) comprise the step of: sliding the at least one of the first and second control members within the first or second sleeve portion.

20. The method of claim 18 wherein:
step (B) comprises the step of: providing each of the first and second attachment portions with at least one projection; and,
before step (C) or (D) the method comprises the step of: attaching the first and second attachment portions to the hopper by extending the projections into the hopper.

* * * * *